(12) United States Patent
Haimer

(10) Patent No.: US 7,318,346 B2
(45) Date of Patent: Jan. 15, 2008

(54) OUT-OF-BALANCE MEASURING DEVICE

(76) Inventor: Franz Haimer, Weiherstr 21, 86568 Hollenbach-Igenhausen, Deutschland (DE)

( * ) Notice: Subject to any disclaimer, the term of this patent is extended or adjusted under 35 U.S.C. 154(b) by 380 days.

(21) Appl. No.: 10/522,088

(22) PCT Filed: Jul. 24, 2003

(86) PCT No.: PCT/EP03/08183
§ 371 (c)(1),
(2), (4) Date: Jan. 21, 2005

(87) PCT Pub. No.: WO2004/011896
PCT Pub. Date: Feb. 5, 2004

(65) Prior Publication Data
US 2005/0235750 A1 Oct. 27, 2005

(30) Foreign Application Priority Data
Jul. 25, 2002 (DE) .............. 102 33 917

(51) Int. Cl.
G01M 1/16 (2006.01)
(52) U.S. Cl. ........................................ 73/462
(58) Field of Classification Search ............ 73/462
See application file for complete search history.

(56) References Cited

U.S. PATENT DOCUMENTS 4,445,372 A * 5/1984 Buzzi .................... 73/459
6,386,031 B2 * 5/2002 Colarelli et al. ........... 73/462
6,389,895 B2 * 5/2002 Colarelli et al. ........... 73/462
6,393,911 B2 * 5/2002 Colarelli et al. ........... 73/462
6,397,675 B1 * 6/2002 Colarelli et al. ........... 73/462
6,405,591 B1 * 6/2002 Colarelli et al. ........... 73/462
6,422,074 B1 * 7/2002 Colarelli et al. ........... 73/462
6,435,027 B1 * 8/2002 Colarelli et al. ........... 73/462
6,658,936 B2 * 12/2003 Matsumoto ................ 73/460
6,799,460 B1 * 10/2004 Parker et al. ............. 73/462
6,854,329 B2 * 2/2005 Colarelli et al. ........... 73/462
2003/0005764 A1 * 1/2003 Colarelli et al. ........... 73/462

* cited by examiner

Primary Examiner—Thomas Noland
Assistant Examiner—Samir M. Shah
(74) Attorney, Agent, or Firm—Scott D. Wofsy; Edwards Angell Palmer & Dodge LLP

(57) ABSTRACT

The unbalance measuring device comprises a spindle unit (7) with a spindle holder (29) and with a spindle (11) mounted on the spindle holder (29) rotatably about an axis of rotation (9) and carrying at one of its two ends a coupling for fastening the article to be measured. The spindle unit (7) is combined together with an electric motor (5) for driving the spindle (11) into a first preassembled subassembly. The spindle holder is itself fastened releasably to a machine base (1) by means of a holder suspension (49), the holder suspension (49) itself being combined into a preassembled subassembly together with a sensor arrangement (61) measuring the unbalance forces during operation. For the releasable fastening of the two subassemblies to one another, connecting elements assigned in an indexed manner, for example a dovetail connection (77), are provided. Since the two subassemblies are preassembled, they can be exchanged on site in the event of a repair, without complicated adjustment measures being required.

31 Claims, 4 Drawing Sheets

OUT-OF-BALANCE MEASURING DEVICE

The invention relates to a device for measuring the rotational unbalance of an article, for example a machine element or a toolholder.

The spindle of modern rotating machine tools, for example drilling or milling machines, operate at very high rotational speeds of 20 000 rev/min. and above. At these rotational speeds, even if there is only a slight unbalance, high centrifugal forces occur which not only load the spindle bearings of the machine tool, but are also detrimental to the service life of the tool and also the machining result. The toolholder is therefore conventionally balanced on balancing machines, such as are known, for example, from WO 00/45 983, with or without a tool inserted, before use in a machine tool.

So that the unbalance of the article to be balanced can be measured with sufficient accuracy in terms of size and direction, the freedom from unbalance and the setting of the balancing machine must satisfy the highest possible requirements, since an inherent unbalance of the balancing machine would falsify the measurement result. Ways of reducing the inherent unbalance of the balancing machine to a great extent are described in WO 00/45 983.

Whereas high precision can be ensured during the production of the balancing machine, a corresponding degree of accuracy cannot be achieved in conventional machines in the event of an "on site" repair. By contrast, a return of the balancing machine for exact setting at the factory entails a high outlay in view of the usually high overall weight of the machine.

The object of the invention is to show a way whereby a simple "on-site" repair of an unbalance measuring device can be achieved.

The invention proceeds from a device for measuring the rotational unbalance of an article, comprising:
- a spindle unit with a spindle holder and with a spindle mounted on the spindle holder rotatably about an axis of rotation and carrying at one of its two ends a coupling for fastening the article;
- a holder suspension for fastening the spindle unit to a machine base, said holder suspension guiding the spindle holder deflectably in a predetermined measurement direction for unbalance forces, but preferably rigidly transversely to the predetermined measurement direction for unbalance forces;
- an electric motor driving the spindle in rotation, and
- a sensor arrangement measuring the unbalance force in the predetermined measurement direction during rotation of the spindle.

The improvement according to the invention is characterized in that the spindle unit and the electric motor are combined into a first preassembled subassembly and the holder suspension and the sensor arrangement are combined into a second preassembled subassembly, and in that the two subassemblies carry connecting elements, assigned to one another in an indexed manner, for the operationally releasable fastening of the subassemblies to one another.

The components relevant for measurement accuracy are in this case combined into subassemblies which can in each case be preassembled, for example in the production factory, and which can be set and checked according to the requirements. In the event of a defect of one of the subassemblies, the defective subassembly can be exchanged on site, without readjustment being necessary. The connecting elements assigned to one another in an indexed manner ensure the correct orientation of the subassemblies with respect to one another. In particular the machine base, which can be transported only with difficulty because of its normally high weight, does not have to be modified locally.

The two subassemblies may be integral parts of a balancing machine provided solely for balancing purposes. However, the invention is not restricted to such an application. The two subassemblies may also implement the unbalance measuring function in connection with other machines or appliances. For example, the unbalance measuring device may be an integral part of a shrinkage appliance, such as described, for example, in WO 01/89 758 A1, which shrinks the tool in a tool holder. The connection of the unbalance measuring device to a presetting appliance determining or setting the reference length of a tool chucked in a tool holder is also advantageous. Finally, the unbalance measuring device may also be an integral part of the machine tool itself.

A further aim of the invention is to improve the freedom from unbalance of the unbalance measuring device. It was shown that the electric motor combined with the spindle holder into a subassembly may, in the event of a possible inherent unbalance of the motor, generate oscillations which reduce the measurement accuracy. If, as is desirable for the sake of a simple mechanical construction, the electric motor is arranged axially parallel next to the spindle so as to be offset with respect to the axis of rotation of the spindle and is fastened to the spindle holder, then the electric motor exerts on the sensor arrangement, via the spindle holder, a cantilever moment which is modulated by any unbalance oscillations. In order to keep this cantilever moment as low as possible, the electric motor should be mounted at the shortest possible distance from the sensor arrangement in order to mitigate the moment arm. This aim is served when the electric motor is arranged in such a way that a plane containing the axes of rotation of the electric motor and of the spindle is inclined with respect to an axial longitudinal plane of the spindle perpendicular to the predetermined measurement direction.

It likewise serves to mitigate measurement errors due to unbalance oscillations if the electric motor and the spindle holder are flanged to a common connecting yoke on the same side of the latter, in particular if that end of the spindle which is remote from the fastening coupling is drive-connected to the electric motor by means of an endless drive belt. The drive belt can thus be arranged very near to the connecting yoke, this being beneficial to the mechanical stability and freedom from oscillation of the drive connection. This results, in a very simple and easily mountable mechanical construction of the first subassembly.

The fastening coupling of the spindle unit expediently comprises a pneumatic actuating device, such as described, for example, in WO 00/45983. However, the construction of the supply of compressed air to the pneumatic actuating device can be simplified if the latter comprises a rotary compressed-air coupling which is held on the spindle holder and which is in constant rotational engagement with the spindle. Contrary to what is described in WO 00/45983, the release of the rotary compressed-air coupling during the measurement operation may be dispensed with if the rotary coupling is fixed in relation to the spindle holder guiding the spindle, that is to say the rotary coupling is not subjected to load due to radial oscillations of the spindle.

In a preferred refinement, the holder suspension comprises two holder elements which are connected to one another deflectably in the predetermined measurement direction and of which one can be connected to the spindle holder and the other to the machine base. The sensor arrangement has at least one force sensor held between the two holder elements. Such a subassembly is mechanically stable, and the force sensor can be accommodated in a protected way between the two holder elements.

The holder elements may be arranged at a distance from one another and be held against one another by at least one spacer rigid in the distance direction and flexible transversely thereto at least in the measurement direction, but, in particular, a plurality of such spacers. Such a holder suspension is mechanically stable and can absorb the weight moment of the subassembly, in particular when the measurement direction runs horizontally. The spacers are expediently designed as leaf springs, the leaf spring plane of which runs perpendicularly to the measurement direction and which are consequently flexible essentially solely in the measurement direction. In this respect, however, it should be pointed out that the spacers are to be flexible only to a very slight extent, since the force sensors, which are, for example, piezoelectric force sensors, manage with extremely small deflection travels for force measurement. In principle, instead of the leaf springs, spacer bolts or the like may be used. Insofar as the holder elements are arranged at a distance from one another transversely to the measurement direction, the holder elements preferably have projections which project in pairs toward one another and between which the force sensor is arranged.

In a variant, the holder elements of the holder suspension may be arranged at a distance from one another and be held against one another by at least one spacer flexible in the distance direction defining the measurement direction and essentially rigid transversely thereto. In this refinement, for the force measurement, the holder elements are at least slightly moveable in their distance direction, in any event more moveable than in the remaining direction intended for absorbing the weight moments of the first subassembly. In this refinement, the spacer may be designed, for example, as a U-shaped leg spring and, if appropriate, be formed in one part with the holder elements.

So that unbalance quantities distributed unevenly along the axis of rotation and consequently leading to wobbling movements of the axis of rotation of the spindle can be measured, the sensor arrangement preferably has two force sensors which are arranged at a distance from one another in the direction of the axis of rotation of the spindle and are held between the two holder elements. Expediently, the force sensors are supported mirror-symmetrically on the two holder elements with respect to an axial longitudinal plane of the spindle perpendicular to the force measurement direction, so that the two force sensors are always either pressed or pulled by codirectional forces. Characteristic curve differences of the two force sensors which are dependent on force direction thus cannot have an effect on one another, which is beneficial to measurement accuracy. Furthermore, measurement accuracy is increased if each force sensor is assigned a spring element prestressing the force sensor in the predetermined force measurement direction. On account of the prestress, the force sensor can be point-supported in the force measurement direction, for example be clamped between two tips, so that no transverse forces falsifying the measurement result can be introduced into the force sensor. The spring element, too, may be mounted between tips, in order, here too, to avoid transverse force errors.

In principle, the force sensor and the spring element assigned to it may be clamped in series between the two holder elements. However, in this refinement, the prestressing force cannot be set independently of the reaction force exerted thereby on the holder suspension, for example its leaf springs. An adjustment of the prestress which is independent of the reaction force on the holder suspension is achieved when the force sensor and the spring element assigned to it are supported, prestressed, in series with one another on one of the two holder elements and the other holder element is supported on the force sensor in the force path between the force sensor and the spring element. The reaction force path of the spring element is in this case closed via this one holder element, not via its flexible spacers.

The connecting elements which connect the two subassemblies releasably to one another ensure an indexed assignment of the axis of rotation of the spindle to the measurement direction of the force sensor, specifically preferably in terms of both the distance and the direction. In a preferred refinement, the connecting elements of the two subassemblies have joining faces which are intended to bear against one another and which allow predetermined positioning of the connecting elements in relation to one another in the predetermined measurement direction and in at least one direction perpendicular thereto. An especially exact and nevertheless easily releasable connection of the two subassemblies is made possible by connection means designed as a dovetail guide, in particular when clamping means are used for fixing. Such a dovetail guide has guide face pairings which run at an acute angle with respect to one another and allow exact positioning in two coordinate directions perpendicular to one another. In the third coordinate direction, an indexing limit stop is expediently provided in the displacement direction of the dovetail guide. Since that end of the spindle which carries the fastening coupling is, as a rule, freely accessible, the mounting of the first subassembly is greatly facilitated if the displacement direction of the dovetail guide runs in the direction of the axis of rotation of the spindle.

A further advantage of such a dovetail guide is its comparatively low space requirement transversely to the parting plane. The spindle unit and consequently also the electric motor can thereby be brought nearer to the sensor arrangement in order to mitigate measurement errors due to unbalance moments. In particular, the dovetail guide may have dovetail guide faces, one of which is integrally formed directly on the spindle holder, especially when the spindle holder has essentially a cylindrical outer contour which surrounds the integrally formed dovetail guide face on the outside. Such a spindle holder, including the dovetail guide face, can be produced integrally from a cylindrical tube in a very simple way.

In principle, during the assembly of the subassemblies, the dovetail guide can be slipped in from their opposite end faces. However, since the subassemblies also often have connected to them electrical cables or pneumatic lines, the length of which would have to take into account the displacement travel, it is more beneficial if the mutually assigned dovetail guide faces have bayonet cutouts which allow the connecting elements to be plugged together transversely to the displacement direction of the dovetail guide. This refinement not least facilitates assembly in the case of confined space conditions. The aim is to achieve as direct a coupling of the spindle unit to the sensor arrangement as possible. This can be achieved, for example, by the connection means being provided on the spindle holder of the holder suspension.

The unbalance measuring device determines the unbalance both in terms of size and according to the angular position in relation to the axis of rotation of the spindle. Conventional unbalance measuring devices have two separate angle-of-rotation sensors, of which a first measures the absolute angle of rotation and a second detects a reference position of the spindle, that is to day a zero point position, in relation to which the first angle-of-rotation sensor is to measure the angle of rotation. The necessity of having to provide two angle-of-rotation sensors not only increases the outlay in terms of construction, but makes it more difficult to carry out assembly in which the two angle-of-rotation sensors have to be set. Furthermore, the conventional angle-of-rotation sensors are often not mounted directly on the spindle, but, for example, on the electric motor, thus leading to measurement errors.

In a further aspect of the invention which also has independent significance, there is provision for there to be fastened at one of the axial ends of the spindle, in particular at the end carrying the fastening coupling for the article, an annular surface element, the circumference of which is provided with a magnetic or optical information carrier both for information representing the angle of rotation and for information representing the zero-point rotary position, and for a reading head arrangement for reading this information to be connected to the spindle holder. The spindle thus directly carries the information both for the direction of rotation and for the zero-point rotary position, thus having an effect on detection accuracy, and this information is detected by means of a single reading head subassembly, thus making mounting easier.

The information carrier may be, for example, a coating consisting of magnetizable material, such as is customary in magnetic tapes; however, a magnetic tape or a tape with optical information, for example in the form of a bar scale, may also be glued directly onto the circumference of the, for example, cylindrical annular surface element. Preferably, the information carrier carries axially next to one another two information tracks which are sensed separately from one another by the reading head arrangement. However, the two information items may also be recorded in a common track and differ from one another in an electronically separable way in their information content.

Insofar as the information carrier is a magnetic tape portion which is glued onto the circumference of the annular surface element, the magnetic tape portion may be provided, before being glued on, with periodic magnetizing pulses representing the angle-of-rotation division. This premagnetization of the magnetic tape portion before application has the disadvantage, however, that a possible stretching of the magnetic tape portion when the latter is being glued on results in subsequent measurement errors. Further measurement errors may occur in the region of the joining point of the two mutually abutting ends of the magnetic tape portion. Measurement errors in the region of the joining point can be avoided if the mutually abutting ends of the magnetic tape portion are cut obliquely in the tape plane, that is to say if the joining point extends over a comparatively large circumferential portion. When, in such an instance, the angle-of-rotation information and, if appropriate, the zero-point rotary position information are written onto the magnetic tape portion after the latter is glued on, a very high angular accuracy of the measurement can be achieved, specifically even in the region of the oblique-cut joint.

The optical information carrier can be read by incident light, that is to say with reflection. However, optical sensors operate in a more faultfree manner by transmitted light in conjunction with an optical information carrier which can be sensed by transmitted light and which, for example, may be in the form of a transilluminatable annular disk.

Preferably, the annular surface element has, on its surface facing away from the spindle, optical angular degree markings as an aid to the manual orientation of the spindle during the application of unbalance compensation weights or compensation cutouts.

Exemplary embodiments of the invention are explained in more detail below with reference to the drawing in which.

Figure 1:
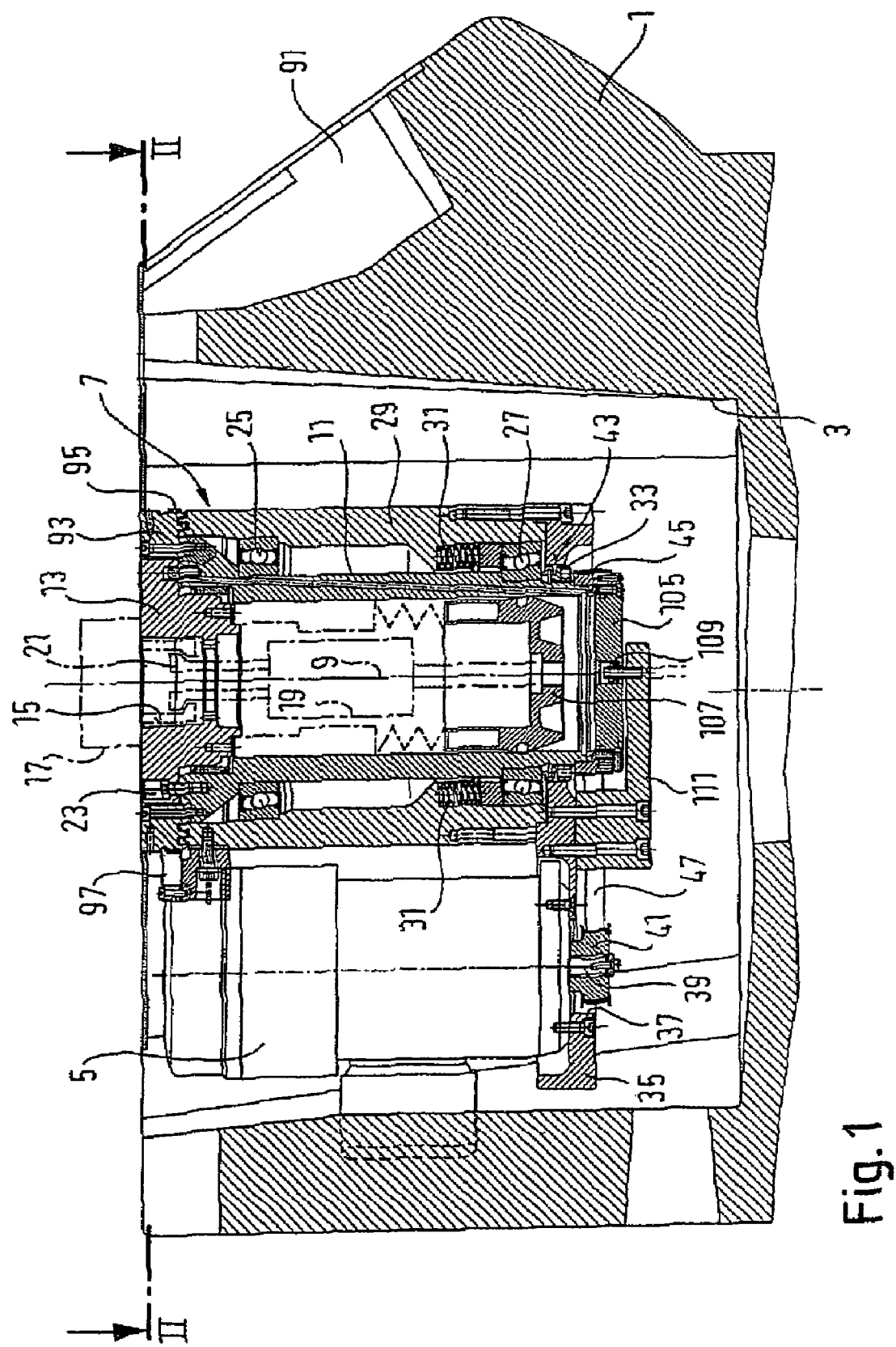
FIG. 1 shows an axial longitudinal section through a balancing machine for toolholders, as seen along a line I-I in FIG. 2.
Figure 2:
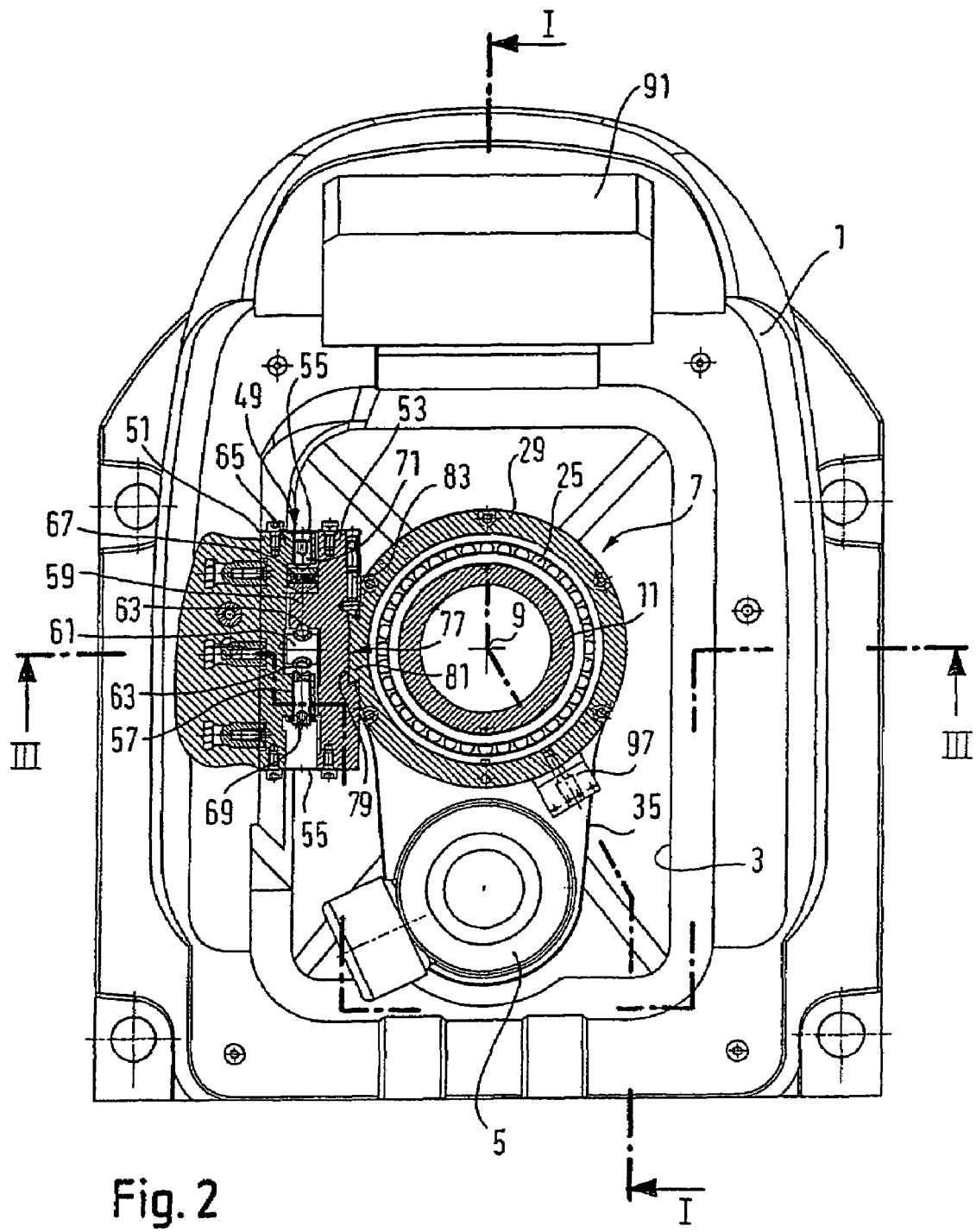
FIG. 2 shows an axial cross section through the balancing machine, as seen along a line II-II in FIG. 1.
Figure 3:
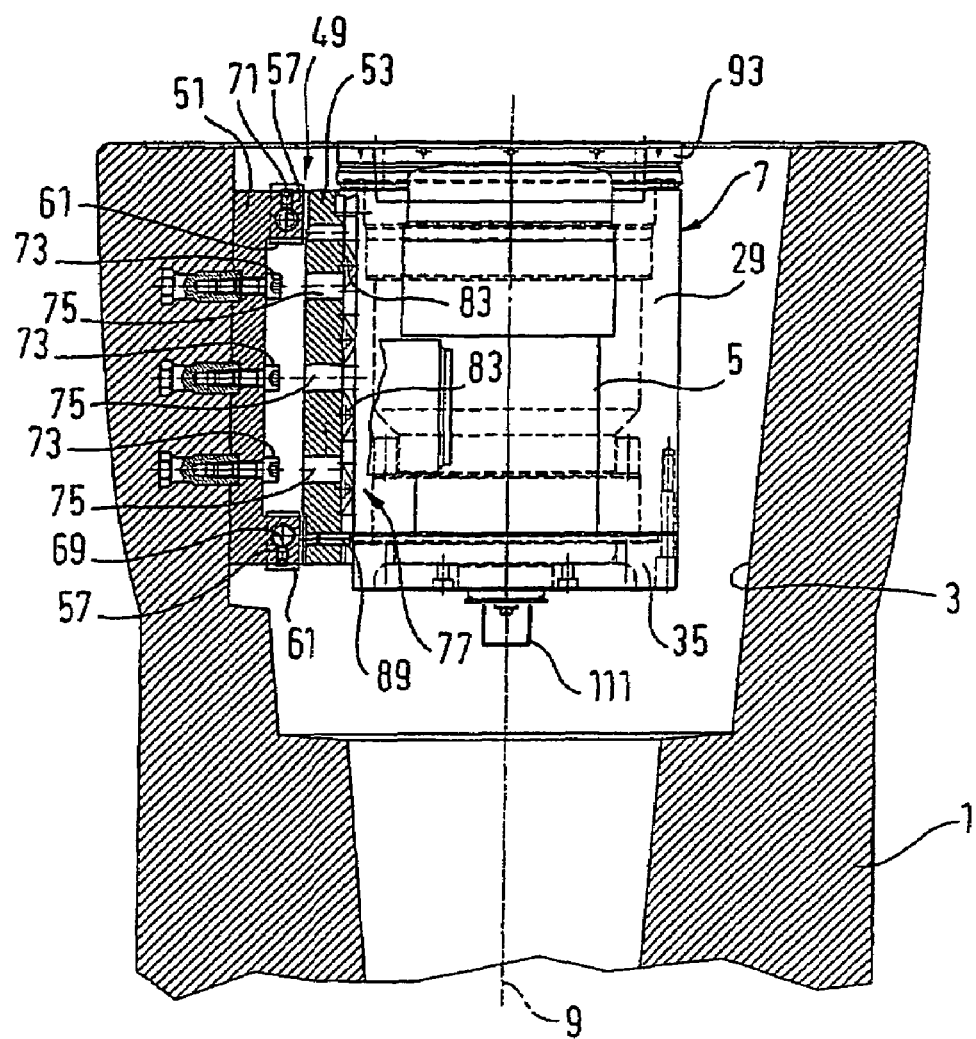
FIG. 3 shows a sectional view of the balancing machine, as seen along a line III-III in FIG. 2.

The balancing machine illustrated in FIGS. 1 to 3 has a housing 1 which serves as a machine base and, for the purpose of standing stability, is cast from a heavy material, for example concrete or the like, and which contains, in a chamber 3 accessible from above, a spindle unit 7 driven by an electric motor 5. The spindle unit 7 has a rotating spindle 11 which is arranged here with a vertical axis of rotation 9 and which has at its upper end an operationally exchangeable coupling adaptor 13 with a reception orifice 15, centric to the axis of rotation 9, for the connection of a standardized toolholder to be balanced, indicated at 17. The toolholder may be a conventional steep-angled taper toolholder or else a hollow-shank taper holder (HST holder). The spindle 11 is designed as a hollow spindle and contains an actuating device 19, explained in more detail below, which, with the aid of a collet chuck 21, holds the toolholder 17 in the coupling adaptor 13 during unbalance measurement. The coupling adaptor 13 is fastened to the spindle 11 by means of screws 23 and is exchangeable according to the type of toolholder.

The spindle 11 is mounted, free of play, in a tubulocylindrical spindle holder 29 by means of two ball bearings 25, 27 arranged at an axial distance from one another, axial bearing play being compensated by means of prestressing springs 31 and a spring nut 33 surrounding the spindle 11.

The electric motor 5 is arranged next to the spindle unit 7, axially parallel to the axis of rotation 9, and is flanged, together with the spindle holder 29, on the same side of an essentially plate-shaped connecting yoke 35. The connecting yoke 35 has a passage orifice 37 for a belt pulley 41 seated fixedly in terms of rotation on a shaft 39 of the electric motor 5, and also a further passage orifice 43 for the spindle 11, which carries a further belt pulley 45 at its end facing away from the coupling adaptor 13. An endless belt drive 47 makes the drive connection between the belt pulleys 41, 45 and consequently between the electric motor 5 and the spindle 11. Since the drive belt 47 runs near to the connecting yoke 35, the drive connection is comparatively rigid. Since, as is also explained below, the angular determination of the unbalance vector to be measured takes place directly on the spindle 11 and not, as in conventional unbalance measuring devices, on the electric motor, the drive belt can even slip to some extent. There is therefore no need to use a complicated slipfree toothed belt.

The subassembly consisting of the electric motor 5 and of the spindle unit 7 is held on the housing 1 by means of a holder receptacle 49 fastened releasably to the spindle holder 29. The holder receptacle 49 comprises two essentially plate-shaped holder elements 51, 53 which are arranged at a distance from one another via a plurality of leaf spring elements 55 (FIG. 2) and are fastened to one another. The leaf spring elements 55 run in planes parallel to one another and to the axis of rotation 9, so that the leaf spring elements 55 are rigid in the distance direction of the holder elements 51, 53 and also in the vertical direction, while the holder elements 51, 53 can be deflected slightly in the horizontal direction by unbalance centrifugal forces. In each case one of two force sensors 61 are clamped adjacently to the upper end of the spindle 11, on the one hand, and adjacently to the lower end of the spindle 11, on the other hand, between projections 57, 59 of the holder elements 51, 53, which projections to be projected in pairs from the holder elements 51, 53 toward the other holder element in each case, said force sensors measuring the unbalance forces exerted by the spindle unit 7 in the horizontal measurement direction via the holder elements 51, 53 at the upper end and at the lower end of the spindle unit 7. To avoid transverse forces, the force sensors 61 bear in an articulated manner against the assigned projections 57, 59 via bearing balls 63. On one of the holder elements, the holder element 51, as illustrated in FIG. 2, in addition to the projection 57, a further projection 65 is provided, the projection 59 of the other holder element 53 engaging between said projections. Between the projections 65 and 59 is clamped an elastic prestressing element 67 which ensures a particular prestress of the force sensor 61. Setscrews 69, 71, located opposite one another in the measurement direction, in the projections 57 and 65 make it possible to set the position of the force sensor 61 and set the prestressing force of the prestressing element 67. Each of the two force sensors 61 and the resilient prestressing element assigned to it are supported, prestressed, in series with one another on one of the two holder elements, while the other holder element is supported on the force sensor 61 in the force path between the force sensor 61 and the prestressing element 67. This ensures that the reaction force path of the prestressing element 67 is closed directly via a single one of the holder elements and the leaf spring elements 55 are not subjected to load. The leaf spring elements 55 are assigned in pairs to the force sensors 61 and are likewise located opposite one another in pairs in the measurement direction. Finally, to avoid transverse forces, the prestressing elements 67 are also mounted in an articulated manner between tips, as shown by way of example in FIG. 2.

The force sensors 61, which are arranged at a distance from one another at the upper and at the lower end of the spindle unit 7, are supported mirror-symmetrically on the two holder elements 51, 53 with respect to an axial longitudinal plane of the spindle 11 perpendicular to the force direction. As shown in FIG. 2 for the other force sensor 61, this is supported, with respect to the axis of rotation 9, clockwise on the projection 59 of the spindle-side holder element 53 and counterclockwise on the projection 57 of the housing-side holder element 51. By contrast, the lower force sensor 61 is supported clockwise on the housing-side holder element 51 and counterclockwise on the spindle-side holder element 53. Correspondingly, the reaction force path of the prestressing element 67 assigned to the lower force sensor 61 is closed via the spindle-side holder element 53. It goes without saying that the type of support of the lower and of the upper force sensor 61 may be interchanged. The advantage of this type of arrangement is that, in the event of a tilting movement of the spindle 11, both force sensors 61 are either pressure-loaded or pressure-relieved codirectionally. Characteristic curve differences of the force sensors which are dependent on force direction accordingly do not influence the measurement result. It goes without saying that the prestressing elements 67 of the two force sensors 61 of the two force sensors 61 are likewise arranged on opposite sides of said axial longitudinal sectional plane.

Just as the spindle unit 7 and the electric motor 5 are combined into a separately preassembled subassembly, the holder receptacle 49 with the force sensors 61 arranged between the holder elements 51, 53 is also combined into a second preassembled subassembly which is fastened as a preassembled subassembly to the housing 1. For this purpose, the holder element 51 is screwed to the housing 1 by means of screws 73 which are accessible via holes 75 in the holder element 53 (FIG. 3).

The subassembly consisting of the spindle unit 7 and of the electric motor 5 is itself indexed by means of a dovetail guide, designated in general by 77, that is to say is fastened releasably in a predetermined position in relation to the holder suspension 49 to that holder element 53 of the latter which is remote from the housing. The dovetail guide 77 has, on the holder element 53, a dovetail groove 79 which extends axially parallel to the axis of rotation 9 and in which a dovetail key 81 is guided longitudinally displaceably. The dovetail key 81 can be fixed with the aid of a plurality of clamping screws 83 distributed in the longitudinal direction of the dovetail guide 77 and capable of being set transversely to the longitudinal direction.

Figure 4:
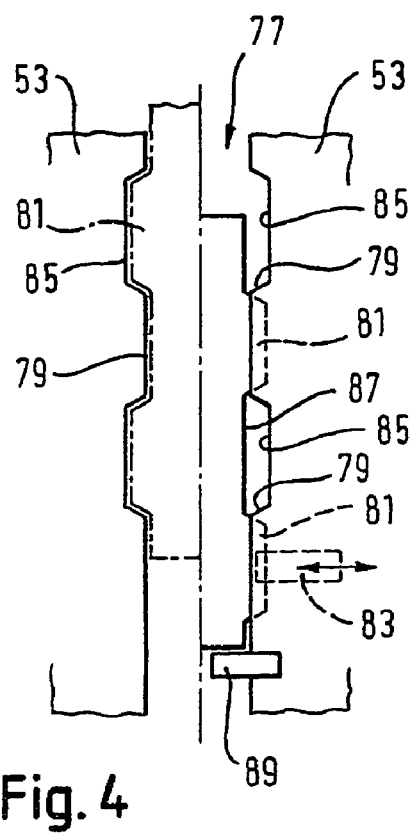
FIG. 4 shows a diagrammatic top view of a dovetail guide of the balancing machine.

As shown in FIG. 4, both the dovetail groove 79 and the dovetail key 81 have a plurality of bayonet cutouts 85 and 87 which segment the dovetail groove 79 and the dovetail key 81 in the longitudinal direction. FIG. 4 shows, in its right half, the dovetail guide 77 in its indexed end position, in which a stop pin 89 provided on the holder element 53 defines the end position of the spindle unit 7 in relation to the holder suspension 49 in the displacement direction of the dovetail guide 77. The segments of the dovetail key 81 in this case overlap the segments of the dovetail groove 79. The bayonet cutouts 85, 87 make it possible to attach the spindle unit 7 near the end position of the dovetail guide 77 transversely to the displacement direction of the latter, since, as FIG. 4 shows in its left half, the bayonet cutouts 85, 87 form perforations for the segments of the bayonet groove 79 and of the bayonet key 81 respectively. The segmentation of the dovetail guide 77 makes mounting considerably easier.

The electric motor 5 suspended on the holder receptacle 49 via the spindle unit 7 exerts on the force sensors 61 a cantilever moment which is modulated by possible unbalance oscillations of the electric motor 5. The measurement error resulting from this can be mitigated if the moment arm of the cantilever moment is reduced as far as possible, that is to say the electric motor 5 is brought as near as possible to the vertical plane running through the force measurement direction of the force sensors 61. As shown by way of example in FIG. 2, for this purpose, the plane containing the axes of rotation 9 of the spindle 11 and the axis of rotation, not designated in any more detail, of the electric motor 5 is arranged in such a way that it runs transversely to an axial longitudinal sectional plane of the spindle 11 running perpendicularly to the force measurement direction. Insofar as the construction space allows, the selected angle between these planes may, if appropriate, also be smaller than 90°.

A further reduction in the moment arm is achieved in that the dovetail key 81 lies within the cylindrical contour of the spindle holder 29, that is to say is incorporated into the outer cylindrical surface area of the spindle holder 59. Furthermore, this measure simplifies production.

The electronic control, not illustrated in any more detail, of the unbalance measuring device is accommodated, including the associated operating elements in a desk-like chamber 91 of the housing 1. For determining the unbalance in terms of size and angular position, there must be a transmission to the control both of information on a predetermined reference position, that is to say a zero-point rotary position of the spindle 11 in relation to the spindle holder 29 and consequently in relation to the housing 1 and of information on the size of the angle-of-rotation deviation of the instantaneous rotary position of the spindle 11 from this reference position. For this purpose, the upper spindle end carrying the coupling adaptor 13 has fastened to it an information carrier ring 93 which carries a magnet tape portion 95 annularly on its circular-cylindrical outer surface. The magnetic tape portion 95 has written onto it at uniform angular dimension intervals magnetic angle information which is read by reading head arrangement 97 fastened releasably to the spindle holder 29 and which is supplied to the control. The magnetic tape portion 95 carries both information representing the angle of rotation and information on the zero-point. rotary position. Even though both types of information can be recorded in a common track of the magnetic tape portion 95, it is nevertheless preferable to provide two information tracks 99 (FIG. 5) which lie next to one another and of which one contains the angle-of-rotation information and the other the zero-point rotary position information. The reading head arrangement 97 has correspondingly two reading heads assigned to the individual tracks 99.

Figure 5:
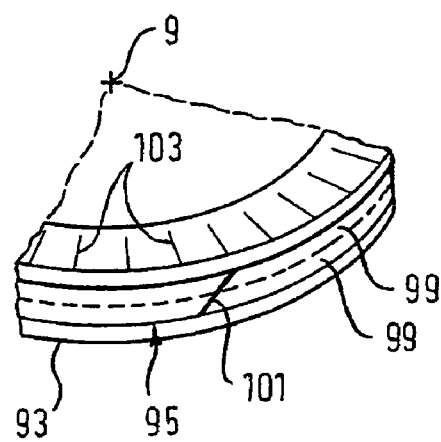
FIG. 5 shows a partial illustration of an information carrier ring.

The magnetic tape portion 95 is closed in a circumferential direction, and, as shown in FIG. 5, its mutually abutting ends are cut obliquely in the tape plane and form an oblique-cut joint 101 running at an acute angle with respect to the circumferential direction of the ring 93. The magnetic information is written onto the information carrier ring 93 after the magnetic tape portion 95 has been glued on. The advantage of this is that, despite the oblique-cut joint 101, magnetic information can be recorded even in this region. The oblique-cut joint 101 at most shortens the axial height of the track available for recording.

Optical angular degree markings, for example in the form of radial bars 103, which enable the user to orient the spindle manually in relation to the reference position, are formed on that face of the information carrier ring 93 which is accessible from above.

The toolholder 17 inserted into the coupling adaptor 13 is fixed by the chuck 21 during operation. To actuate the chuck 21, the spindle 11 is closed at its lower end by means of a cover 105 (FIG. 1) and forms a compressed-air cylinder, in which a compressed-air piston 107 can be displaced, sealed off, for the actuation of the chuck 21. The supply of compressed air takes place via a centric rotary compressed-air coupling 109 on the cover 105, said coupling being in constant rotational engagement. The coupling 109 is held on a carrying arm 111 which, in turn, is arranged within the region surrounded by the drive belt 47 and which is fastened to the connecting yoke 35 and consequently to the spindle holder 29. What is achieved thereby is that the drive belt 47 can be changed, without the carrying arm 111 having to be demounted. Since the rotary coupling 109 is fastened to the spindle holder 29 guiding the spindle 11, that is to say accompanies radial movements of the spindle 11, the rotary coupling can be constantly in engagement, in contrast to the case in WO 00/45983. For a further explanation of a suitable exemplary embodiment of the chuck 21 and of its actuating members, reference is made to WO 00/45983.

Variants of the unbalance measuring device explained above with reference to FIGS. 1 to 5 are described below. Identically acting components are designated by the reference numerals of FIGS. 1 to 5 and are given a letter in order to distinguish them. For an explanation of the construction and type of operation, reference is made to the description of FIGS. 1 to 5. It goes without saying that components of these figures which are not illustrated may also be present in the variants.

Figure 6:
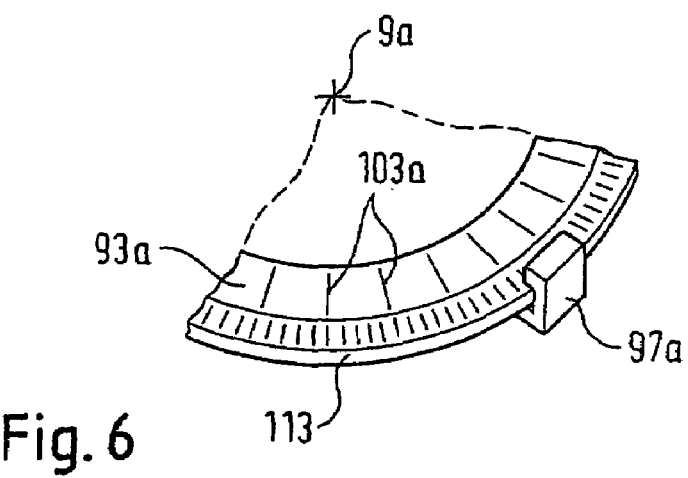
FIG. 6 shows a partial illustration of a variant of the information carrier ring.

FIG. 6 shows a variant of a measuring arrangement delivering both angle-of-rotation information and zero-point rotary position information. Arranged again at the upper end of the spindle is an information carrier ring 93a, from the circumference of which an annular disk 113 provided with optical angle information projects radially. The angle information is again recorded in two tracks, not illustrated in more detail, arranged radially next to one another and is read by the transmitted-light method by the optical reading head arrangement 97a.

It goes without saying that the optical information may also be read by the incident-light method, that is to say by reflection. On the other hand, the annular disk 113 may also carry magnetic information instead of optical information, just as the circumferential information with regard to FIG. 5 may also be capable of being read optically. In the exemplary embodiment of FIG. 6, too, the information carrier ring carries, on its face accessible from above, optical angular degree markings 103a for the manual orientation of the spindle with respect to the reference position.

Figure 7:
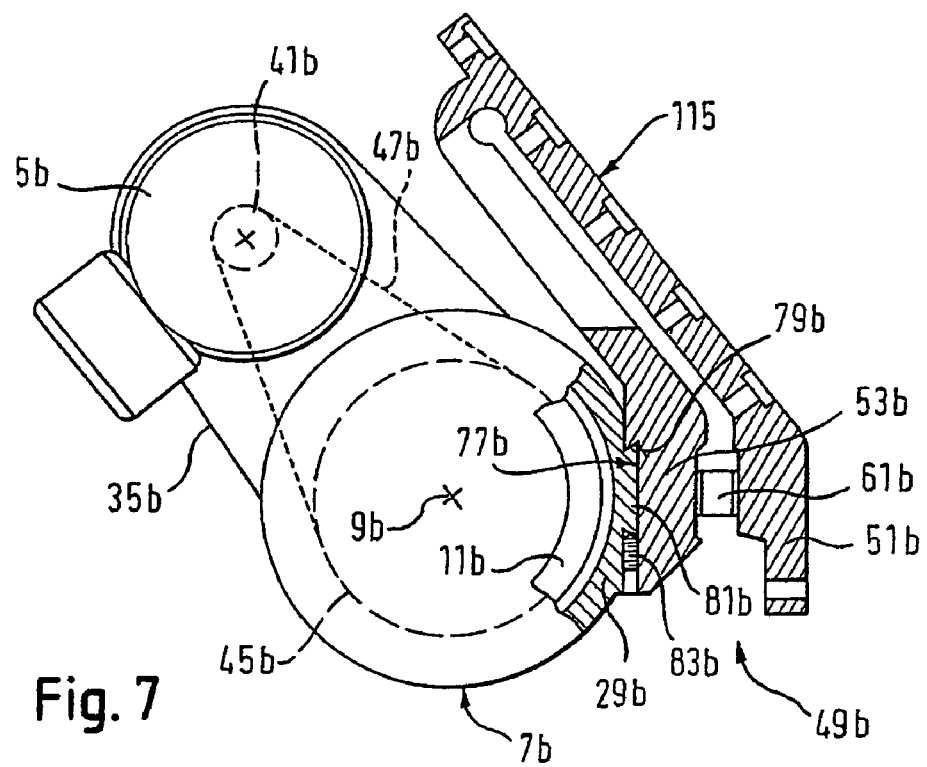
FIG. 7 shows a partial illustration of a variant of the balancing machine.

FIG. 7 shows a variant of the unbalance measuring device comprising two separately preassembled subassemblies. In this embodiment, too, the electric motor 5b and the spindle unit 7b form a preassembled subassembly and are flanged radially next to one another coaxially at their lower ends to the connecting yoke 35b. For the drive connection, belt pulleys 41b, 45b, over which the belt 47b runs, are provided. This subassembly is releasably fastened in an indexed manner by means of the dovetail connection 77b to the second preassembled subassembly consisting of the holder suspension 49b and of the sensor arrangement 61b. The dovetail connection 77b again has a dovetail groove 79b and a dovetail key 81b and, according to the embodiment explained in connection with FIGS. 1 to 5, can be segmented in a bayonet-like manner and fixed by means of clamping screws 83b.

In contrast to the embodiment explained above, the force sensors 61b held between holding elements 51b, 53b detect unbalance forces in the direction of the distance between the holder elements 51b, 53b and for this purpose are connected in one piece to a U-shaped leg spring 115. The leg spring 115 absorbs the cantilever moment of the subassembly fastened to the holder element 53b and consisting of the motor 5b and of the spindle unit 7b. Here, too, the electric motor 5b is installed nearer to the leg spring 115 in order to mitigate the moment arm. It goes without saying that, in this embodiment too, two force sensors can be arranged so as to be offset relative to one another in the direction of the axis of rotation 9b, so that tilting oscillations can be detected. Suspension of the force sensors 61b between the holder elements 51b, 53b may correspond to the variant of FIGS. 1 to 5.

The invention claimed is:

1. A device for measuring the rotational unbalance of an article, comprising:

a) a spindle unit with a spindle holder and with a spindle mounted on the spindle holder rotatably about an axis of rotation and carrying at one of its two ends a coupling for fastening the article;
b) a holder suspension for fastening the spindle unit to a machine base, said holder suspension guiding the spindle holder deflectably in a predetermined measurement direction for unbalance forces;
c) an electric motor driving the spindle in rotation; and
d) a sensor arrangement measuring the unbalance force in the predetermined measurement direction during rotation of the spindle, wherein the spindle unit and the electric motor are combined into a first preassembled subassembly and the holder suspension and the sensor arrangement are combined into a second preassembled subassembly, and wherein the two subassemblies carry connecting elements, assigned to one another in an indexed manner, wherein the connecting elements operationally releasably fasten the subassemblies to one another.

2. The device as claimed in claim 1, wherein the electric motor is arranged axially parallel next to the spindle so as to be offset with respect to the axis of rotation of the spindle and is fastened to the spindle holder.

3. The device as claimed in claim 2, wherein the electric motor is arranged in such a way that a plane containing the axes of rotation of the electric motor and of the spindle is inclined with respect to an axial longitudinal plane of the spindle perpendicular to the predetermined measurement direction.

4. The device as claimed in claim 1, wherein the electric motor and the spindle holder are flanged to a common connecting yoke on the same side of the connecting yoke.

5. The device as claimed in claim 4, wherein the end of the spindle which is remote from the fastening coupling is drive-connected to the electric motor by means of an endless drive belt.

6. The device as claimed in claim 1, wherein the fastening coupling of the spindle unit has a pneumatic actuating device, the compressed-air supply of which comprises a rotary compressed-air coupling which is held on the spindle holder and which is in constant rotational engagement with the spindle.

7. The device as claimed in claim 6, wherein the rotary compressed-air coupling is provided centrically to the axis of rotation of the spindle on a carrying arm which is arranged solely within the region surrounded by the drive belt.

8. The device as claimed in claim 1, wherein the holder suspension comprises two holder elements which are connected to one another deflectably in the predetermined measurement direction and of which one can be connected to the spindle holder and the other to the machine base, and wherein the sensor arrangement has at least one force sensor held between the two holder elements.

9. The device as claimed in claim 8, wherein the holder elements are arranged at a distance from one another and are held against one another by at least one spacer rigid in the distance direction and flexible transversely thereto at least in the measurement direction, in particular a plurality of such spacers.

10. The device as claimed in claim 9, wherein the holder elements have projections which project in pairs toward one another and between which the force sensor is arranged.

11. The device as claimed in claim 8, wherein the holder elements are arranged at a distance from one another and are held against one another by at least one spacer flexible in the distance direction defining the measurement direction and essentially rigid transversely thereto.

12. The device as claimed in claim 8, wherein the sensor arrangement has two force sensors which are arranged at a distance from one another in the direction of the axis of rotation of the spindle and are held between the two holder elements and which are supported mirror-symmetrically on the two holder elements with respect to an axial longitudinal plane of the spindle perpendicular to the force measurement direction.

13. The device as claimed in claim 8, wherein each force sensor is assigned a spring element prestressing the force sensor in the predetermined force measurement direction.

14. The device as claimed in claim 13, wherein the force sensor and the spring element assigned to it are supported, prestressed, in series with one another on one of the two holder elements, and the other holder element is supported on the force sensor in the force path between the force sensor and the spring element.

15. The device as claimed in claim 13, wherein at least one of the force sensor and the spring element is held in the force measurement direction on both sides between pivot bearings, particularly balls or tips.

16. A device for measuring the rotational unbalance of an article, comprising:
a) a spindle unit with a spindle holder and with a spindle mounted on the spindle holder rotatably about an axis of rotation and carrying at one of its two ends a coupling for fastening the article;
b) a holder suspension for fastening the spindle unit to a machine base, said holder suspension guiding the spindle holder deflectably in a predetermined measurement direction for unbalance forces;
c) an electric motor driving the spindle in rotation; and
d) a sensor arrangement measuring the unbalance force in the predetermined measurement direction during rotation of the spindle, wherein the spindle unit and the electric motor are combined into a first preassembled subassembly and the holder suspension and the sensor arrangement are combined into a second preassembled subassembly, and wherein the two subassemblies carry connecting elements, assigned to one another in an indexed manner, wherein the connecting elements operationally releasably fasten the subassemblies to one another;

wherein the holder suspension comprises two holder elements which are connected to one another deflectably in the predetermined measurement direction and of which one can be connected to the spindle holder and the other to the machine base, and wherein the sensor arrangement has at least one force sensor held between the two holder elements;

wherein the holder elements are arranged at a distance from one another and are held against one another by at least one spacer rigid in the distance direction and flexible transversely thereto at least in the measurement direction, in particular a plurality of such spacers; and wherein the spacers are designed as leaf springs, the leaf spring plane of which runs perpendicularly to the measurement direction.

17. A device for measuring the rotational unbalance of an article, comprising:
a) a spindle unit with a spindle holder and with a spindle mounted on the spindle holder rotatably about an axis of rotation and carrying at one of its two ends a coupling for fastening the article;

b) a holder suspension for fastening the spindle unit to a machine base, said holder suspension guiding the spindle holder deflectably in a predetermined measurement direction for unbalance forces;

c) an electric motor driving the spindle in rotation; and d) a sensor arrangement measuring the unbalance force in the predetermined measurement direction during rotation of the spindle, wherein the spindle unit and the electric motor are combined into a first preassembled subassembly and the holder suspension and the sensor arrangement are combined into a second preassembled subassembly, and wherein the two subassemblies carry connecting elements, assigned to one another in an indexed manner, wherein the connecting elements operationally releasably fasten the subassemblies to one another;

wherein the holder suspension comprises two holder elements which are connected to one another deflectably in the predetermined measurement direction and of which one can be connected to the spindle holder and the other to the machine base, and wherein the sensor arrangement has at least one force sensor held between the two holder elements;

wherein the holder elements are arranged at a distance from one another and are held against one another by at least one spacer flexible in the distance direction defining the measurement direction and essentially rigid transversely thereto; and wherein the spacer is designed as a U-shaped leg spring.

18. A device for measuring the rotational unbalance of an article, comprising:

a) a spindle unit with a spindle holder and with a spindle mounted on the spindle holder rotatably about an axis of rotation and carrying at one of its two ends a coupling for fastening the article;

b) a holder suspension for fastening the spindle unit to a machine base, said holder suspension guiding the spindle holder deflectably in a predetermined measurement direction for unbalance forces;

c) an electric motor driving the spindle in rotation; and d) a sensor arrangement measuring the unbalance force in the predetermined measurement direction during rotation of the spindle, wherein the spindle unit and the electric motor are combined into a first preassembled subassembly and the holder suspension and the sensor arrangement are combined into a second preassembled subassembly, and wherein the two subassemblies carry connecting elements, assigned to one another in an indexed manner, wherein the connecting elements operationally releasably fasten the subassemblies to one another;

wherein the connecting elements of the two subassemblies have joining faces which are intended to bear against one another and which allow predetermined positioning in the predetermined measurement direction and in at least one direction perpendicular thereto.

19. The device as claimed in claim 18, wherein the connecting elements are designed as a dovetail guide and comprise clamping means for fixing.

20. The device as claimed in claim 19, wherein the displacement direction of the dovetail guide runs in the direction of the axis of rotation of the spindle.

21. The device as claimed in claim 19, wherein the dovetail guide has dovetail guide faces, one of which is integrally formed directly on the spindle holder.

22. The device as claimed in claim 21, wherein the spindle holder has essentially a cylindrical outer contour which surrounds the integrally formed dovetail guide face on the outside.

23. The device as claimed in claim 19, wherein the dovetail guide is assigned an indexing limit stop in the displacement direction.

24. The device as claimed in claim 19, wherein the dovetail guide has mutually assigned dovetail guide faces with bayonet cutouts which allow plugging together transversely to the displacement direction of the dovetail guide.

25. The device as claimed in claim 18, wherein the connecting elements are provided on the spindle holder and the holder suspension.

26. A device for measuring the rotational unbalance of an article, comprising:

a) a spindle unit with a spindle holder and with a spindle mounted on the spindle holder rotatably about an axis of rotation and carrying at one of its two ends a coupling for fastening the article;

b) a holder suspension for fastening the spindle unit to a machine base, said holder suspension guiding the spindle holder deflectably in a predetermined measurement direction for unbalance forces;

c) an electric motor driving the spindle in rotation; and d) a sensor arrangement measuring the unbalance force in the predetermined measurement direction during rotation of the spindle, wherein the spindle unit and the electric motor are combined into a first preassembled subassembly and the holder suspension and the sensor arrangement are combined into a second preassembled subassembly, and wherein the two subassemblies carry connecting elements, assigned to one another in an indexed manner, wherein the connecting elements operationally releasably fasten the subassemblies to one another;

wherein there is fastened at one of the axial ends of the spindle, in particular at the end carrying the fastening coupling for the article, an annular surface element, the circumference of which is provided with a magnetic or optical information carrier both for information representing the angle of rotation and for information representing the zero-point rotary position, and in that a reading head arrangement for reading this information is connected to the spindle holder.

27. The device as claimed in claim 26, wherein the information carrier has next to one another two information tracks which are sensed separately from one another by the reading head arrangement.

28. The device as claimed in claim 26, wherein the information carrier is designed as a magnetic tape portion which is glued onto the circumference of the annular surface element and the mutually abutting ends of which are cut obliquely in the tape plane.

29. The device as claimed in claim 28, wherein the information representing at least one of the angle of rotation and the zero-point rotary position also overlaps the region of the oblique-cut joint of the magnetic tape portion.

30. The device as claimed in claim 26, wherein the information carrier is designed as an optical information carrier, particularly in the form of an annular disk, which can be sensed by transmitted light.

31. The device as claimed in claim 26, wherein the annular surface element has, on its surface facing away from the spindle, optical angular degree markings.

* * * * *

UNITED STATES PATENT AND TRADEMARK OFFICE
CERTIFICATE OF CORRECTION

PATENT NO.         : 7,318,346 B2
APPLICATION NO. : 10/522088
DATED                : January 15, 2008
INVENTOR(S)      : Franz Haimer It is certified that error appears in the above-identified patent and that said Letters Patent is hereby corrected as shown below:

On the title page item [73], please add the Assignee data as follows:

Assignee:    Franz Haimer Maschinenbau KG
             Hollenbach-Igenhausen, Germany Signed and Sealed this Twenty-fourth Day of March, 2009

JOHN DOLL
*Acting Director of the United States Patent and Trademark Office*